(12) United States Patent
Tulchinsky et al.

(10) Patent No.: US 11,510,429 B2
(45) Date of Patent: Nov. 29, 2022

(54) CYCLIC KETAL COMPOUNDS HAVING LONG SIDE CHAINS USEFUL AS FOAM CONTROL AGENTS IN THE MANUFACTURE OF FOOD AND BEVERAGE PRODUCTS

(71) Applicant: Dow Global Technologies LLC, Midland, MI (US)

(72) Inventors: Michael L. Tulchinsky, Midland, MI (US); Xue Chen, Manvel, TX (US); Clark H. Cummins, Midland, MI (US); Stephen W. King, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 309 days.

(21) Appl. No.: 16/585,514

(22) Filed: Sep. 27, 2019

(65) Prior Publication Data

US 2020/0100531 A1    Apr. 2, 2020

Related U.S. Application Data

(60) Provisional application No. 62/738,309, filed on Sep. 28, 2018.

(51) Int. Cl.
*A23L 29/00* (2016.01)
*B01D 19/04* (2006.01)
*A23L 2/54* (2006.01)

(52) U.S. Cl.
CPC ............... *A23L 29/035* (2016.08); *A23L 2/54* (2013.01); *B01D 19/0404* (2013.01)

(58) Field of Classification Search
CPC ...... A23L 29/035; A23L 2/54; B01D 19/0404
USPC ................................. 426/329, 330, 654, 564
See application file for complete search history.

(56) References Cited

U.S. PATENT DOCUMENTS

| 5,429,718 A | 7/1995 | Morlino et al. |
| 9,018,266 B2 | 4/2015 | Matani et al. |

FOREIGN PATENT DOCUMENTS

DE    197 02 846 A1    7/1998

OTHER PUBLICATIONS

Iyer, M.; Hayes, D. G.; Harris, J. M., Synthesis of pH-degradable nonionic surfactants and their applications in microemulsions. Langmuir 2001, 17, (22), 6816-6821.

*Primary Examiner* — Leslie A Wong
(74) *Attorney, Agent, or Firm* — Kagan Binder, PLLC

(57) ABSTRACT

Cyclic ketal compounds provide excellent foam protection when having at least one moiety of a threshold size (comprising 4 or more carbon atoms) pendant from a ketal carbon. The carbons in such moieties may be present in one or more chains. The cyclic ketal compounds of the present invention are compatible with foodstuff manufacturing. In particular, it has been discovered that the cyclic ketal compounds of the present invention exhibit excellent foam control performance in both potato and sugar beet processing systems.

21 Claims, No Drawings

CYCLIC KETAL COMPOUNDS HAVING LONG SIDE CHAINS USEFUL AS FOAM CONTROL AGENTS IN THE MANUFACTURE OF FOOD AND BEVERAGE PRODUCTS

PRIORITY

The present nonprovisional patent Application claims priority under 35 U.S.C. § 119(e) from U.S. Provisional patent application having Ser. No. 62/738,309, filed on Sep. 28, 2018, by Chen et al. and titled CYCLIC KETAL COMPOUNDS HAVING LONG SIDE CHAINS USEFUL AS FOAM CONTROL AGENTS IN THE MANUFACTURE OF FOOD AND BEVERAGE PRODUCTS, wherein the entirety of said provisional patent application is incorporated herein by reference for all purposes

FIELD OF THE INVENTION

The present invention is in the field of using foam control agents to control foaming in the manufacture of food and beverage products. More particularly, the present invention relates to using cyclic ketal compounds as foam control agents in order to help control foam in the manufacture of food and beverage products, wherein at least one ketal side chain including 4 or more carbon atoms is pendant from the ketal carbon.

BACKGROUND OF THE INVENTION

Industrial technologies may generate foam when fluid mixtures are mixed, agitated, under mechanical shear, exposed to acoustic energy, filtered, boiled, extruded, sprayed, sparged, coated, or the like. In some instances, foaming results due to entrapment of air or other gases. Solutions, dispersions, emulsions, gels, and the like all may be susceptible to foaming. Often, foaming is undesirable. Foaming decreases process efficiency and may compromise product quality. Foaming may also damage equipment.

Food and beverage products typically incorporate one or more foodstuff ingredients. A foodstuff ingredient is a substance suitable for human or animal consumption. A foodstuff ingredient may be derived from one or more foodstuff ingredient precursors. The ingredient precursors are substances that are physically or chemically modified to form further precursors or the desired ingredients, depending on the stage of manufacture and how many manufacturing stages are involved. Processing the ingredient precursors may involve unwanted foam generation. For example, production of sugar or other products from sugar beets requires complex processing of sugar-containing plant juices. Many of the processing steps, including juice recovery and purification stages, may be instances at which unwanted foaming could occur. Different stages of manufacturing food and beverage products derived from potatoes also may give rise to severe foam formation.

Thus, foam control strategies are highly desired and widely used in the manufacture of food and beverage products. Mechanical methods of foam management have had limited effectiveness used on their own. Instead, one or more foam control agents may be incorporated into in-process mixtures in order to help control foam generation. Foam control agents optionally may be used as an alternative to such mechanical methods of foam control or, if desired, in combination with such mechanical methods. A foam control agent may control foam in different ways such as to prevent foam from forming on the first instance (an antifoam agent) and/or to break up foam that forms (a defoamer).

Several classes of foam control agents are known. One class results from alkoxylation of polyols. Another class includes alkyl polyglucosides. Another class includes glycerol esters. Notwithstanding the availability of these different classes, there remains a strong demand for foam control agents that are suitable for use in the manufacture of foodstuffs.

SUMMARY OF THE INVENTION

The present invention is based on the discovery that cyclic ketal compounds such as erythritol ketals, glycerol ketals and ethylene glycol ketals provide excellent foam protection when having at least one moiety of a threshold size (comprising 4 or more carbon atoms) pendant from a ketal carbon. The carbons in such moieties may be present in one or more chains. While not wishing to be bound by theory, it is believed that the ketal compounds may have antifoam and/or defoaming characteristics.

The cyclic ketal compounds of the present invention are compatible with foodstuff manufacturing. In particular, it has been discovered that the cyclic ketal compounds of the present invention exhibit foam control performance in both potato and sugar beet processing systems. Similar cyclic ketal compounds with smaller pendant moieties (i.e., containing 3 or less C atoms) were much less active as foam control agents and even may have no foam control ability.

The cyclic ketal compounds of the present invention are useful as foam control agents in basic or generally neutral environments, e.g., a pH of about 6 or more. Similar to alkyl glucosides, these compounds tend to break down in acidic media with pH less than about 6. This allows acidification by pH adjustment of neutral or basic compositions to be used to remove or accelerate the degradation of the cyclic ketal compounds.

In one aspect, the present invention relates to a method of controlling foam in the manufacture of a food or beverage product, comprising the steps of
   a) providing a foodstuff; and
   b) processing the foodstuff in the presence of at least one cyclic ketal compound comprising a ketal carbon and at least two other ketal ring carbons, wherein the cyclic ketal compound comprises first and second ketal side chains that are pendant from the ketal carbon, wherein the first ketal side chain comprises 1 or more carbon atoms, and wherein the second ketal side chain includes 4 or more carbon atoms.

In another aspect, the present invention relates to a foodstuff composition, comprising:
   a) at least one foodstuff; and
   b) at least one cyclic ketal compound comprising a ketal carbon and at least two other ketal ring carbons, wherein the cyclic ketal compound comprises first and second ketal side chains that are pendant from the ketal carbon, wherein the first ketal side chain comprises 1 or more carbon atoms, and wherein the second ketal side chain includes 4 or more carbon atoms.

DETAILED DESCRIPTION OF PRESENTLY PREFERRED EMBODIMENTS

The present invention will now be further described with reference to the following illustrative embodiments. The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

The present disclosure describes methods for controlling foam. The methods described herein are particularly relevant to control foam with respect to manufacturing of food or beverage products suitable for animal or human consumption. The food or beverage products may have a wide range of forms including being present as a solid, slurry, liquid, gel, dispersion, emulsion, combinations of these, and the like. Food or beverage products may be prepared and then served or used for consumption. Alternatively, food or beverage products may be packaged, stored, transported, displayed, or otherwise handled for later consumption or use.

During food processing, for example, foam can be generated at various stages in the production process. The foam may be caused by one or more factors such as the presence of surface-active substances such as saponins (e.g., amphipathic glycosides), proteins, fatty acids, starches, and/or sugars. Foodstuff compositions may be particularly vulnerable to foaming when aeration (generated for example by mechanical agitation, acoustic agitation, mixing, shaking, washing, spraying, extruding, coating, extraction, stirring, sparging, diffusing, fermentation, etc.) occurs during processing. Foam impairs the food processing process in many different ways and greatly disrupts the process flow. The methods described herein are effective in controlling foam in a food or beverage processing application as compared to a similar process carried out in the absence of foam control agents. Without being limited by theory, it is believed that the methods of the present disclosure have features that may (1) limit the amount of foam generated in a process (also known as providing anti-foam protection); and/or (2) reduce or eliminate generated foams (also known as providing defoaming protection).

In an illustrative method of the present invention, a foodstuff composition is provided that includes at least one foodstuff ingredient and/or at least one foodstuff ingredient precursor that, in some instances, may be in admixture with a liquid carrier. As used herein, a foodstuff ingredient is any substance that is suitable for animal or human consumption. Foodstuff ingredient may be used either singly or in combination with other ingredients in order to prepare food or beverage products. A foodstuff ingredient precursor is any substance that is physically and/or chemically modified in one or more steps to form one or more derivative substances, such as one or more further foodstuff ingredient precursors and/or one or more foodstuff ingredients. A foodstuff ingredient, a foodstuff ingredient precursor, or a derivative thereof may be a natural substance, a synthetic substance, or a derivative of one or more natural and/or synthetic substances. As used herein, the term "foodstuff" refers collectively to a foodstuff ingredient, a foodstuff ingredient precursor, a derivative of the foregoing, and/or combinations thereof. Hence, each of a foodstuff ingredient, a foodstuff ingredient precursor, a derivative of the foregoing is a type of foodstuff.

Without wishing to be bound by theory, it is believed that the presence of saponins, proteins, starches, and/or sugars in a foodstuff composition may contribute to an increased risk of foam generation, particularly in the presence of a liquid carrier such as an aqueous liquid carrier. The foam control agents of the present invention, as demonstrated by examples below, are useful to help control foaming in such compositions. Accordingly, at least one foodstuff in the provided foodstuff composition may comprise one or more saponins, one or more starches, one or more proteins, one or more sugars, or combinations of these. In some embodiments, a foodstuff may include one or more starches and one or more sugars. In other embodiments, a foodstuff may include one or more starches and one or more proteins. In other embodiments a foodstuff may include one or more sugars and one or more proteins. In other embodiments, a foodstuff may include one or more sugars, one or more starches, and one or more proteins. In other embodiments, a foodstuff may include one or more saponins and at least one of one or more starches, one or more proteins, and one or more sugars.

The liquid carrier, if present, may be water, an organic solvent, or a combination of these. Examples of organic solvents include organic acids such as acetic acid and/or citric acid; alcohols such as ethanol; plant or animal oils; combinations of these, and the like. In many modes of practice solvents comprising water and/or ethanol would be suitable. Preferred liquid carriers are aqueous and include at least 20 weight percent, or even at least 50 weight percent, even at least 80 weight percent, even at least 95 weight percent, even at least 99 weight percent, or even at least 100 weight percent water based on the total weight of the liquid carrier.

A foodstuff composition may be provided in a variety of physical forms. For example, a foodstuff composition may be a solid, a semisolid, a liquid, a gel, a dispersion, combinations of these, and the like. The foodstuff composition may be present in more than one physical form as conditions change while it is used. For example, solids may melt and become liquid or a vapor as the composition is heated, or a vapor or liquid composition may become a liquid or solid as temperature is lowered.

In the methods of the present invention, the foodstuff composition is processed in a manner that at least physically modifies the food precursor composition. In some embodiments, the foodstuff composition is processed in a manner that physically and chemically modifies one or more foodstuffs of the foodstuff composition. Examples of different processes by which a foodstuff, either singly or in combination with other ingredients, can be physically or chemically modified include washing, pumping, slicing, grating, crushing, peeling, mixing, shaking, acoustic agitation, spraying, extraction, stirring, sparging, extruding, coating, compressing, expanding, diffusing, fermenting, heating, boiling, irradiating with electromagnetic or electron beam energy, freezing, thawing, distilling, extracting, filtering, combinations of these, and the like.

In the practice of the present invention, the processing of the foodstuff composition occurs in the presence of one or more foam control agents, wherein at least one foam control agent is a cyclic ketal compound comprising a ketal carbon and at least two other ketal ring carbons. The cyclic ketal compound comprises first and second ketal side chains that are pendant from the ketal carbon, wherein the first ketal side chain comprises at least one carbon atom, and wherein the second ketal side chain comprises at least 4 or more carbon atoms. In practical effect, this means that at least one of the ketal side chains has a minimum threshold size in terms of carbon atom constituents. It has been found that ketal side chains with this characteristic in a cyclic ketal compound provides the compound with functionality to help control foam in the manufacture of food and beverage products.

In some embodiments, the foam control agent comprises one or more cyclic ketal compounds according to Formula I:

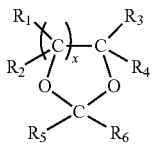

In Formula I, x is 1-4; each of $R_1$, $R_2$, $R_3$, and $R_4$ (hereinafter referred to singly as a "ring substituent" or in the plural as "ring substituents") independently is a monovalent moiety or a co-member of a ring structure with one or more of the other ring substituents. Each ring substituent may be the same as one or more other ring substituents or different from one or more of the other ring substituents. In some embodiments, at least one of these $R_1$, $R_2$, $R_3$, and $R_4$ moieties independently is H or a monovalent moiety other than H comprising 0 to 5 carbon atoms, preferably 1 to 3 carbon atoms. Each $R_1$, $R_2$, $R_3$, and $R_4$ moiety that contains 3 or more carbon atoms independently may be linear or nonlinear (e.g., branched or cyclic). One or more of the ring substituents optionally may be aliphatic or aromatic. Preferably, the ring substituents are aliphatic. One or more of the ring substituents optionally may be saturated or unsaturated. Preferably, the ring substituents are saturated. Optionally, one or more of the ring substituents may include at least one heteroatom (O, S, N, or P) that may be part of the backbone or part of a pendant moiety. In some embodiments, one of the ring substituents is —CH$_2$OH or —CH$_2$CH$_2$OH, and the other ring substituent(s) is/are H. For example, one of the ring substituents may be —CH$_2$OH, and the other ring substituents are H.

In Formula I, the cyclic ketal compound comprises first and second carbon containing moieties $R_5$ and $R_6$ moieties (referred to herein singly as a "ketal side chain" or in the plural as the "ketal side chains") that are pendant from the ketal carbon of the ketal ring. Note, too, from Formula I that the ketal carbon is a ring substituent that is bonded to the two oxygen atoms of the ketal ring structure. A first one of the ketal side chains includes 1 or more carbon atoms, even 1 to 30 carbon atoms, or even 2 to 15 carbon atoms. The other or second ketal side chain includes 4 or more carbon atoms, preferably 4 to 30 carbon atoms, more preferably 4 to 15 carbon atoms. In some embodiments, both of the ketal side includes 4 or more carbon atoms, more preferably 4 to 15 carbon atoms. The carbon atoms in either ketal side chain may be incorporated into one or more carbon-carbon chains. Embodiments of the first and second ketal side chains may be linear, or if a sufficient number of carbon atoms are present, nonlinear (e.g., branched and/or cyclic).

In some embodiments, both of the ketal side chains are nonlinear and include more than 4 carbon atoms, preferably 4 to 30 carbon atoms, more preferably 4 to 15 carbon atoms. In some embodiments, both of the ketal side chains are branched and include more than 4 carbon atoms, preferably 4 to 30 carbon atoms, more preferably 4 to 15 carbon atoms. In some embodiments, both of the ketal side chains include more than 4 carbon atoms, preferably 4 to 30 carbon atoms, more preferably 4 to 15 carbon atoms, and one ketal side chain comprises a cyclic moiety and the other ketal side chain is branched. In some embodiments, both of the ketal side chains comprise a cyclic moiety and include more than 4 carbon atoms, preferably 4 to 30 carbon atoms, more preferably 4 to 15 carbon atoms.

One or more of the ketal side chains optionally may be aliphatic or aromatic. Preferably, the ketal side chains are aliphatic. One or more of the ketal side chains optionally may be saturated or unsaturated. Preferably, the ketal side chains are saturated. Optionally, one or more of the ketal side chains may include at least one heteroatom (O, S, N, or P) that may be part of the backbone or part of a pendant moiety.

As an option, the $R_5$ and $R_6$ moieties may be co-members of a ring structure in some embodiments. In embodiments in which the $R_5$ and $R_6$ moieties are co-members of a ring structure, the $R_5$ and $R_6$ moieties cumulatively include at least 4 carbon atoms.

In some embodiments, the foam control agent comprises a cyclic ketal compound according to Formula II:

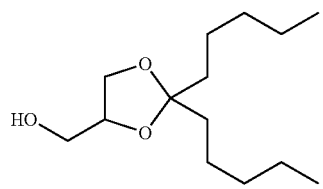 [SMILES: CCCCCC1(CCCCC)OCC(CO)O1]

In some embodiments, the foam control agent comprises a cyclic ketal compound according to Formula III:

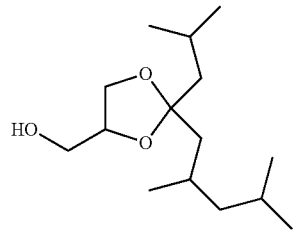 [SMILES: CC(C)CC(C)CC1(CC(C)C)OCC(CO)O1]

In some embodiments, the foam control agent comprises a cyclic ketal compound according to Formula IV:

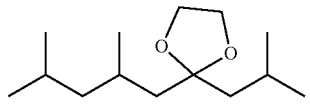 [SMILES: CC(C)CC(C)CC1(CC(C)C)OCCO1]

In some embodiments, the foam control agent comprises a cyclic ketal compound according to Formula V:

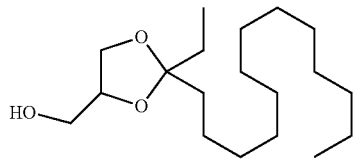

When processing the foodstuff composition in the presence of the at least one foam control agent, an amount of cyclic ketal compound is used that is effective to help control foaming. If too little is used, not enough protection may be provided as might be desired. Using too much may provide little extra foam protection benefit compared to using lesser amounts and in some cases could interfere with processing the foodstuff composition. Balancing these concerns, using from about 0.01 parts by weight to about 5 parts by weight of one or more cyclic ketal compounds per 100 parts by weight of the foodstuff composition would be suitable in illustrative embodiments. Note that the total weight of the foodstuff composition includes the foam control agent and any other constituents of a foam control composition (if any, and described further below) incorporated into the foodstuff composition. Use of one or more cyclic ketal compounds to help control foam is particularly useful in manufacturing methods involving potato processing and sugar beet processing, including operations at risk to foam generation such as mechanical agitation, acoustic agitation, mixing, shaking, washing, spraying, extruding, coating, extraction, stirring, sparging, fermentation, and the like.

A foam control agent including one or more cyclic ketal compounds of the present invention may be incorporated into the foodstuff composition directly as ingredient(s) of the composition. Alternatively, such a foam control agent may first be incorporated into a foam control composition. All or portions of such a composition may then be incorporated into one or more foodstuff compositions at various stages of manufacture in order to help protect against foam generation. A foam control composition may include at least the foam control agent of the present invention and one or more other optional ingredients. Other optional ingredients include one or more other kinds of foam control agents, a solvent, a surfactant, an emulsifier, pH control agents, other additives, and combinations of these. In some embodiments, a foam control composition includes from 0.5 weight percent to 100 weight percent, or preferably 30 weight percent to 100 weight percent of the composition based on the total weight of the composition.

The optional solvent contained in the foam control composition is selected to be suitable for dissolving or dispersing the one or more cyclic ketal compound and the other ingredients (if any) incorporated into the composition. Such solvents include water, oxygenated solvents (e.g., alcohols, ketones, aldehydes, ethers, glycol ethers, esters, and glycol ether esters).

Examples of other kinds of foam control agents include one or more agents produced by the alkoxylation of alcohol(s); at least one alkyl polyglucoside (APG); foam control agents described in one or more of Assignee's U.S. Provisional Patent Applications U.S. Ser. No. 62/644,015 filed Mar. 16, 2018, in the name(s) of Xue Chen, now U.S. Ser. No. 16/971,421, filed Aug. 20, 2020 and published as U.S. 2021/0000147; U.S. Ser. No. 62/644,024 filed Mar. 16, 2018, in the name(s) of Michael L. Tulchinsky, now U.S. Ser. No. 16/636,231, filed Feb. 3, 2020, and published as U.S. 2021/0000153; U.S. Ser. No. 62/644,031 filed Mar. 16, 2018, in the name(s) of Clark H. Cummings, now U.S. Ser. No. 16/636,005, flied Feb. 1, 2020, and published as U.S. 2021/0244060; and U.S. Ser. No. 62/644,038 filed Mar. 16, 2018, in the name(s) of Stephen W. King, now U.S. Ser. No. 16/636,231, filed Feb. 3, 2020, and published as U.S. 2021/0000153; foam control agents described in Assignee's U.S. Provisional Patent Applications filed Sep. 28, 2019 and that are identified as U.S. Provisional Application titled ALKYL ETHER AMINE FOAM CONTROL AGENTS AND METHODS OF PROCESSING FOODSTUFFS, U.S. Ser. No. 62/738,393, in the names of Xue Chen et al., now U.S. Ser. No. 17/280,138, filed Mar. 25, 2021, and published as U.S. 2021/0339171; and U.S. Provisional Application titled HYDROXYETHYL CELLULOSE DERIVATIVE FOAM CONTROL AGENTS AND METHODS OF PROCESSING FOODSTUFFS, U.S. Ser. No. 62/738,421, in the names of Xue Chen et al., now PCT/US2019/051439, filed Sep. 17, 2021, and published as WO 2020/068484; combinations of these, and the like. If such other foam control agents are used, in some embodiments the weight ratio of the one or more cyclic ketal compounds to the total weight of the other foam control agents desirably is in the range from 1:20 to 20:1, preferably 1:10 to 10:1, more preferably 1:5 to 5:1.

The optional surfactant(s) or emulsifier(s) contained in the foam control composition are selected to be suitable for improving the solubility or dispersibility of the foam control agent in the foam control composition or to help the foam protection performance of the foam control agent in the foodstuff composition. The optional surfactant or emulsifier may be used in any effective amount, such as an amount ranging from 0.1 to 30 parts by weight of the surfactant(s) or emulsifier(s) per 100 parts by weight of the total amount of foam control agent(s) in the foam control composition including the cyclic ketal compounds and other foam control agents, if present.

The optional surfactant or emulsifier may be anionic, cationic or nonionic. Examples of suitable anionic surfactants or emulsifiers are alkali metal, ammonium and amine soaps; the fatty acid part of such soaps contains preferably at least 16 carbon atoms. The soaps can also be formed "in situ;" in other words, a fatty acid can be added to the oil phase and an alkaline material to the aqueous phase.

Other examples of suitable anionic surfactants or emulsifiers are alkali metal salts of alkyl-aryl sulfonic acids, sodium dialkyl sulfosuccinate, sulfated or sulfonated oils, e.g., sulfated castor oil; sulfonated tallow, and alkali salts of short chain petroleum sulfonic acids.

Suitable cationic surfactants or emulsifiers are salts of long chain primary, secondary or tertiary amines, such as oleylamide acetate, cetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts, such as dodecyltrimethylammonium chloride, hexadecyltrimethylammonium chloride, octadecyltrimethylammonium chloride, cocoamidopropyltrimethylammonium chloride, benzalkonium chloride, cetylpyridinium bromide, hexadecylethylmorpholinium chloride, and diethyldidodecylammonium chloride.

Examples of suitable nonionic surfactants or emulsifiers are condensation products of higher fatty alcohols with ethylene oxide, such as the reaction product of oleyl alcohol with 10 ethylene oxide units; reaction products of alkylphenols with ethylene oxide, such as the reaction product of isoctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethyleneglycol monobehenate, tricosaethyleneglycol dibehenate, polyhydric alcohol partial higher fatty acid esters such as sorbitan tristearate, ethylene oxide condensation products of polyhydric alcohol partial higher fatty acid esters, and their inner anhydrides (mannitol-anhydride, called Mannitan, and sorbitol-anhydride, called Sorbitan), such as glycerol monopalmitate reacted with 10 molecules of ethylene oxide, pentaerythritol monooleate reacted with 12 molecules of ethylene oxide, sorbitan monostearate reacted with 10-15 molecules of ethylene oxide, mannitan monopalmitate reacted with 10-15 molecules of ethylene oxide; long chain polyglycols in which one hydroxyl group is esterified with a higher fatty acid and other hydroxyl group is etherified with a low molecular alcohol, such as methoxypolyethylene glycol 550 monostearate (550 meaning the average molecular weight of the polyglycol ether). A combination of two or more of these surfactants may be used; e.g., a cationic may be blended with a nonionic or an anionic with a nonionic.

The foam control agent may further comprise one or more other additives. Examples of additives include pH control ingredients to help maintain a suitable neutral or basic pH greater than 6, preferably greater than 6.5, preferably greater than 6.8, or even greater than 7. Other additives may include ethylene oxide/propylene oxide block copolymers, butylene oxide/propylene oxide block copolymers, ethylene oxide/ butylene oxide block copolymers, waxes, or silicone-based materials.

In use, a foam control agent and/or a foam control composition of the present invention may be added to a foodstuff composition prior to a treatment in which the foodstuff composition is subjected to a process that poses a risk of foam generation. Alternatively or in addition to such incorporation, a foam control agent or foam control composition may be added to a foodstuff composition during the course of a processing treatment in order to help reduce an amount of generated foam. Advantageously, use of the foam control agents and compositions of the present invention during processing of foodstuff compositions helps to protect the foodstuff compositions against foaming. The protection is long-lasting as demonstrated in working examples provided below. For example, in the absence of a foam control agent, agitation of sample potato and sugar beet liquors resulting in excessive foam generation in under 2 minutes. In the presence of a foam control agent of the present invention, much longer resistance to foam generation resulted.

Cyclic ketal compounds of the present invention may be formed by a reaction that generally involves reacting at least one polyol with at least one ketone under conditions effective to form the cyclic ketal compound. As used herein, a polyol refers to a hydroxyl functional compound including two or more hydroxyl groups. Examples of polyols include one or more of ethylene glycol, glycerol, erythritol, diglycerol, propylene glycol, butylene glycol, combinations of these and the like. Ethylene glycol, glycerol, and erythritol are preferred. Ethylene glycol and glycerol are more preferred.

A cyclic ketal compound formed from a reaction between ethylene glycol and at least one ketone is referred to herein as an ethylene glycol ketal. A cyclic ketal compound formed from a reaction between glycerol and at least one ketone and/or aldehyde is referred to herein as glycerol ketal. A cyclic ketal compound formed from a reaction between erythritol and at least one ketone and/or aldehyde is referred to herein as an erythritol ketal.

Useful ketone reactants for the present invention include one or more of a linear ketone with 6 to 30 carbon atoms in which the ketone oxygen is pendant from any one of the carbon atoms such as 2-hexanone, 3-hexanone, 2-octanone, 3-octanone, 4-octanone, 2-nonanone, 3-nonanone, 4-nonanone, 5-nonanone, 2-decanone, 3-decanone, 4-decanone, 5-decanone, 2-undecanone, 3-undecanone, 4-undecanone, 5-undecanone, and/or 6-undecanone; a branched ketone including at least one branched carbon backbone of 4 to 30 carbon atoms such as, 2,6,8-trimethyl-4-nonanone (TMN); cyclic ketones such as cyclohexanone, muscone, and/or the like; aromatic ketones such as acetophenone and/or the like; combinations of these, and/or the like.

To carry out the reaction between the at least one polyol and the at least one ketone, a reaction mixture is prepared containing the reactants in a suitable solvent in the presence of a suitable ketal catalyst. The reactants are used in a stoichiometry suitable to favor formation of the desired cyclic ketal compound. In some modes of practice, using a molar ratio of polyol to the ketone in the range from 1:3 to 3:1, preferably 1:1 to 3:1, more preferably 2:1 to 3:1 would be suitable.

Many solvents may be used to carry out the reaction. Generally, in order to favor extraction of the resultant cyclic ketal compound into a suitable organic solvent in which the compound would be soluble, one or more organic solvents such as toluene or the like may be used as all or a part of the reaction solvent. A suitable concentration of reactants in the solvent may be in the range of about 10 parts by weight of the reactants per 50 to 1000 parts by weight of solvent. In some modes of practice, using about 10 parts by weight of reactants per 90 to 110 parts by weight of solvent would be suitable.

A wide range of one or more ketal catalysts may be used. In one illustrative mode of practice, using an acid catalyst such as para-toluene sulfonic acid would be suitable. The one or more catalysts are used in a catalytically effective amount. In some modes of practice, using about 3 parts by weight of catalyst per 50 to 200 parts by weight, preferably about 100 parts by weight of the reactants would be suitable.

The reaction is carried out by heating the reaction mixture and allowing the reactants to react for a suitable time period. Desirably, the reaction is carried out at reflux, as heating at higher temperatures tends to help improve conversion to the desired product in a shorter timeframe than when using cooler temperatures.

Because water tends to be a by-product of the reaction, the formation of water indicates the progress of the reaction. At a point where further formation of water is no longer observed, the reaction may be complete.

The reaction may be carried out at any desired pressure including under vacuum, at atmospheric pressure, or at elevated pressure. Carrying out the reaction at atmospheric pressure or at reduced pressure is more preferred. Elevated pressure may be used to allow carrying out the reaction at higher temperatures in order to favor higher conversion and shorter reaction times.

The reaction is an equilibrium reaction. As the reaction proceeds, equilibrium among reactants and products tends to be reached. At this point, further conversion of reactants into products would no longer occur. The reaction can be driven to higher conversion by withdrawing one or more by-products as the reaction proceeds. For example, water may be withdrawn as the reaction proceeds in order to achieve higher conversions. Using a Dean-Stark trap at the lab scale was found to be a convenient way to remove water from the mixture as the reaction proceeds. Using similar strategies to remove the water at commercial scales may be used for commercial scale production by pulling a vacuum to remove water overhead or using a solvent which can provide a low boiling azeotrope with water When the reaction is complete, the product may be recovered from the reaction mixture. Generally, each of the cyclic ketal compound and unreacted ketone is soluble in organic media. Unreacted polyol, water, and the acid catalyst tend to be more soluble in aqueous media. Accordingly, the desired product can be recovered from the resultant organic phase when the reaction is carried out in an organic solvent such as toluene. The organic phase may be further washed with aqueous media and dried in order to further remove water and water soluble components of the product mixture. Once isolated in the organic phase, the solvent may be dried to provide the product if desired. Further work up to separate the cyclic ketal compound from unreacted ketone or aldehyde may be practiced if desired. Chromatography is one way to accomplish this further separation, if desired.

The present invention will now be further described in connection with the following illustrative examples.

Example 1

Synthesis of
2,2-dipentyl-4-hydroxymethyl-1,3-dioxolane

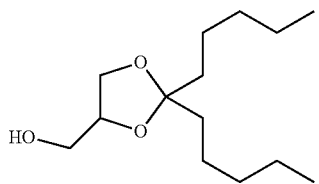 [SMILES: CCCCCC1(CCCCC)OCC(CO)O1]

A mixture of glycerol (4.70 g; 51 mmol), 6-undecanone (2.9 g; 17 mmol; b.p. 228° C.), para-toluene sulfonic acid (0.2 g), and toluene (70 mL) was refluxed in a round-bottom flask equipped with a Dean-Stark trap for 6 hours. About 25 mL of toluene was distilled overhead to the Dean-Stark trap. After this amount of toluene was collected in the Dean-Stark trap, the level of water remained constant indicating the end of the reaction. The product mixture was treated with saturated sodium carbonate (50 mL×2) and distilled water (50 mL). The product mixture separated into an organic (toluene phase) and an aqueous phase after which the toluene layer was separated and dried over sodium sulfate. The toluene or organic phase included a majority of the ketal product. The toluene phase was isolated, and the toluene was evaporated at reduced pressure to give 3.43 g of the product. The product obtained from the organic, toluene phase was analyzed by $^1$H and $^{13}$C NMR in d6-benzene and accurate mass GC-MS to reveal a composition of about ~70% 2,2-dipentyl-4-hydroxymethyl-1,3-dioxolane and ~30% 6-undecanone.

Example 2

Synthesis of 2-iso-butyl-2-(2,4-dimethylpentyl)-4-hydroxymethyl-1,3-dioxolane

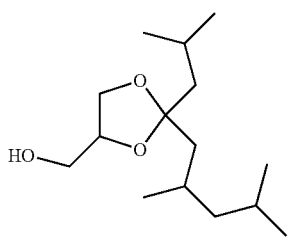 [SMILES: CC(C)CC(C)CC1(CC(C)C)OCC(CO)O1]

A mixture of glycerol (4.60 g; 50 mmol), 2,6,8-trimethyl-4-nonanone (TMN ketone) (4.6 g; 25 mmol), para-toluene sulfonic acid (0.3 g), and toluene (100 mL) was refluxed with a Dean-Stark trap for 6 hours. GC analysis of the product mixture revealed that the conversion to the cyclic ketal compound was about 40%. An additional amount of glycerol (4.60 g; 50 mmol) was added, and the mixture was refluxed in a round-bottom flask equipped with a Dean-Stark trap for an additional 4 hours. GC analysis of the product mixture did not show further conversion of reactants to the cyclic ketal compound. The reaction mixture was treated with saturated sodium carbonate (50 mL×2) and distilled water (50 mL). This caused the reaction mixture to separate into an organic (toluene) phase and an aqueous phase. The organic phase was separated and dried over sodium sulfate. An additional amount of glycerol (4.60 g; 50 mmol) was added to the separated organic phase, and the mixture was refluxed with a Dean-Stark trap for 4 hours. The GC did not show improvement in conversion to the cyclic ketal compound. The work-up with sodium carbonate was repeated, causing the mixture to separate into organic (toluene) and aqueous phases. The organic phase was separated, and toluene was evaporated at reduced pressure to give 5.90 g of the product. The product was analyzed by $^1$H and $^{13}$C NMR in d6-benzene and accurate mass GC-MS to reveal a composition of about ~60% 2-iso-butyl-2-(2,4-dimethylpentyl)-4-hydroxymethyl-1,3-dioxolane and ~40% starting TMN ketone.

Example 3

Synthesis of
2-iso-butyl-2-(2,4-dimethylpentyl)-1,3-dioxolane

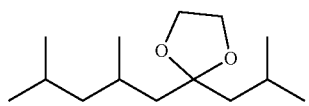 [SMILES: CC(C)CC(C)CC1(CC(C)C)OCCO1]

2,6,8-Trimethyl-4-nonanone (TMN) (4.61 g; 5.63 ml; 25 mmol), ethylene glycol (7.76 g; 6.99 ml; 125 mmol) and 0.46 g of p-toluene sulfonic acid (5 wt % relative to TMN ketone) were refluxed in a round-bottom flask equipped with a Dean-Stark trap at 120° C. with 50 mL of toluene for 18 h, azeotropically removing water to a Dean-Stark trap. Once the level of water stopped increasing in the Dean-Stark trap, the product mixture was cooled and analyzed by GC, showing more than 95% conversion of the starting ketone and more than 90% GC area % of the cyclic ketal. The toluene and aqueous phases were separated. The toluene phase was washed with 5 wt % aqueous sodium bicarbonate, the upper organic phase was separated and dried with sodium sulfate. The toluene was evaporated to give about 6 g of residue. Pure cyclic ketal was isolated by ISCO chromatography on alumina using hexane as an eluent. Analysis by $^1$H and $^{13}$C NMR in d6-benzene and accurate mass GC-MS supported the product purity.

Example 4

Synthesis of 2-ethyl-2-tridecyl-4-hydroxymethyl-1,3-dioxolane

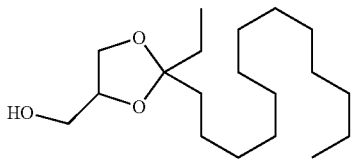 [SMILES: CCCCCCCCCCCCCC1(CC)OCC(CO)O1]

The cyclic ketal compound was prepared according to Iyer, M.; Hayes, D. G.; Harris, J. M.; *Langmuir* 2001, 17(22), 6816-6821.

Comparative Example 1

Synthesis of 2-propyl-1,3-dioxolane

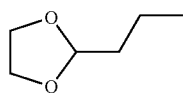

A mixture of ethylene glycol (62.05 g; 1 mol), butyraldehyde (36.1 g; 0.5 mol), p-toluenesulfonic acid (2 g) in hexane (300 ml) was refluxed in a round-bottom flask equipped with a Dean-Stark trap for 3 hrs. The reaction mixture was cooled and extracted with aqueous NaOH (2×50 ml). The hexane phase was dried over solid NaOH, then hexane was evaporated under vacuum and the crude product was distilled to give 53.4 g (92%) of 2-propyl-1,3-dioxolane, b. p. 134-137° C.

Comparative Example 2

2,2-Dimethyl-4-hydroxymethyl-1,3-dioxolane (Solketal) was a commercial product from Sigma-Aldrich:

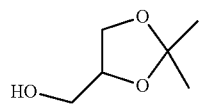

Comparative Example 3

2-Ethyl-2-methyl-1,3-dioxolane was a commercial product from Sigma-Aldrich:

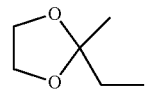

Comparative Example 4

3-heptadecanone was a commercial product from Sigma-Aldrich:

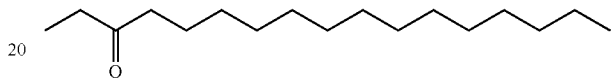

Example 5

Preparation of Potato and Sugar Beet Liquors

Potatoes were washed, peeled and sliced. 780 g of sliced potato and 520 g DI water were added into a kitchen mixer and mixed for 1 minute. A potato slurry was generated which was then filtered through filter paper, and the liquid was collected for the performance testing described below. This medium is referred to as the potato liquor.

Similarly, 780 g of peeled sugar beets and 520 g DI water were mixed and filtered for the performance testing described below. This medium is referred to as the sugar beet liquor.

Example 6

Evaluation of Glycerol Ketals and Ethylene Glycol Ketals

To assess functionality as a foam control agent, 0.5 g of each compound from Examples 1 to 4 and from Comparative Examples 1 to 4 were respectively added into 99.5 g of either the potato liquor or the sugar beet liquor, respectively. For each example, 100 g of the total liquid sample was used for performance evaluation. For comparison, 100 g of each of the potato liquor and sugar beet liquor, without any foam control agent served as control examples, respectively. Thus, a total of 10 liquid, foam control samples were prepared.

A sparge tube test was used to evaluate the foam control properties of the foam control agents in each of the foam control samples. 100 g of each example were added, respectively, into a glass cylinder that had a volume of 1000 ml and a diameter of 5 cm. An air grit was placed at the cylinder bottom, and air was bubbled from the bottom of the cylinder. Air flow was controlled by an Ametek Lo-Flo 0-10 Float Meter with the setting of 1. Foam heights as a function of time were recorded for each sample during the first 10 minutes after air flow was applied. However, if the foam height reached 1000 ml within the first 10 minutes, the experiment was stopped for that sample. The foam heights over time for the samples are reported in Tables 1 and 2:

TABLE 1

Foam volumes of sugar beet liquor (ml) at 5,000 ppm dosage.

|  | 0.5 min | 1 min | 2 min | 3 min | 4 min | 5 min | 6 min | 7 min | 8 min | 9 min | 10 min |
|---|---|---|---|---|---|---|---|---|---|---|---|
| control | 480 | 600 | >1000 | >1000 | >1000 | >1000 | >1000 | >1000 | >1000 | >1000 | >1000 |
| ex 1 | 70 | 90 | 130 | 180 | 200 | 220 | 350 | 350 | 350 | 350 | 350 |
| ex 2 | 50 | 50 | 70 | 90 | 90 | 100 | 120 | 150 | 150 | 150 | 150 |
| ex 3 | 600 | 640 | 600 | 600 | 640 | 690 | 810 | >1000 | >1000 | >1000 | >1000 |
| ex 4 | 130 | 160 | 300 | 420 | 400 | 410 | 410 | 410 | 410 | 420 | 420 |
| cp. 1 | 210 | 250 | 350 | 430 | 470 | 520 | 550 | 600 | 620 | 630 | 630 |
| cp. 2 | 550 | 800 | >1000 | >1000 | >1000 | >1000 | >1000 | >1000 | >1000 | >1000 | >1000 |
| cp. 3 | 800 | 850 | >1000 | >1000 | >1000 | >1000 | >1000 | >1000 | >1000 | >1000 | >1000 |
| cp. 4 | 450 | 570 | >1000 | >1000 | >1000 | >1000 | >1000 | >1000 | >1000 | >1000 | >1000 |

TABLE 2

Foam volumes of potato liquor (ml) at 5,000 ppm dosage.

|  | 0.5 min | 1 min | 2 min | 3 min | 4 min | 5 min | 6 min | 7 min | 8 min | 9 min | 10 min |
|---|---|---|---|---|---|---|---|---|---|---|---|
| control | 320 | 600 | >1000 | >1000 | >1000 | >1000 | >1000 | >1000 | >1000 | >1000 | >1000 |
| ex 1 | 360 | 380 | 450 | 480 | 500 | 500 | 490 | 490 | 490 | 490 | 490 |
| ex 2 | 300 | 310 | 330 | 330 | 330 | 300 | 250 | 250 | 200 | 200 | 200 |
| ex 3 | 380 | 420 | 480 | 480 | 480 | 400 | 400 | 400 | 400 | 400 | 400 |
| ex 4 | 30 | 40 | 70 | 110 | 140 | 170 | 210 | 210 | 230 | 290 | 300 |
| cp. 1 | 590 | 650 | >1000 | >1000 | >1000 | >1000 | >1000 | >1000 | >1000 | >1000 | >1000 |
| cp. 2 | 510 | 590 | 740 | 830 | >1000 | >1000 | >1000 | >1000 | >1000 | >1000 | >1000 |
| cp. 3 | 600 | 730 | >1000 | >1000 | >1000 | >1000 | >1000 | >1000 | >1000 | >1000 | >1000 |
| cp. 4 | 480 | 620 | 680 | 770 | >1000 | >1000 | >1000 | >1000 | >1000 | >1000 | >1000 |

As shown in the tables, the samples including the foam control agents from Examples 1, 2, and 4 have very good foam control in the sugar beet liquor over the full 10 minute span of the test. Additionally, the foam control agent for Example 3 provided foam control protection through 6 minutes. In contrast, the control sample foamed excessively by 2 minutes. The foam control agents in the comparative samples generally were no better than the control example except that Comparative Example 1 provide foam protection through the full 10 minutes.

All of the foam control agents from Examples 1-4 showed good foam control performance in the potato liquor. All provided good foam protection through the full 10 minutes of testing. In contrast, the control sample foamed excessively by 2 minutes. The foam control agents in the comparative samples generally were no better than the control example except that Comparative Examples 2 and 4 provide foam protection through 3 minutes.

All patents, patent applications, and publications cited herein are incorporated by reference in their respective entireties for all purposes. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of controlling foam during processing of a foodstuff, comprising steps of:
   a) providing a foodstuff; and
   b) processing the foodstuff in a composition comprising at least one cyclic ketal compound according to Formula I:

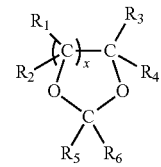

wherein x is an integer in the range of 1-4, $R_1$, $R_2$, $R_3$, and $R_4$ are independently selected from the group consisting of H, a co-member of a ring-structure with at least one of the other $R_1$, $R_2$, $R_3$, or $R_4$, and a monovalent moiety other than H comprising 0 to 5 carbon atoms, wherein one of $R_5$ and $R_6$ comprises at least one carbon atom and the other of $R_5$ and $R_6$ comprises at least 4 carbon atoms, the at least one cyclic ketal compound according to Formula I present in the composition in an amount in the range of 0.01 weight percent to 5 weight percent.

2. The method of claim 1, wherein the foodstuff comprises at least one of one or more saponins, one or more starches, one or more proteins, one or more sugars, or combinations thereof.

3. The method of claim 1, wherein the foodstuff comprises at least a portion of a sugar beet or a sugar beet derivative.

4. The method of claim 1, wherein the foodstuff comprises at least a portion of a potato or a potato derivative.

5. The method of claim 1, wherein at least one of $R_1$, $R_2$, $R_3$, or $R_4$ is the monovalent moiety, said monovalent comprising at least one hydroxyl group.

6. The method of claim 1, wherein the other of $R_5$ and $R_6$ has a number of carbon atoms in the range of 4 to 30 and is nonlinear.

7. The method of claim 1, wherein the other of $R_5$ and $R_6$ has a number of carbon atoms in the range of 4 to 30 and is branched.

8. The method of claim 6, wherein the other of $R_5$ and $R_6$ has a number of carbon atoms in the range of 4 to 15.

9. The method of claim 7, wherein the other of $R_5$ and $R_6$ has a number of carbon atoms in the range of 4 to 15.

10. The method of claim 5, wherein said monovalent moiety comprising at least one hydroxyl group is a hydroxyalkyl moiety.

11. The method of claim 10, wherein the hydroxyalkyl moiety comprises a hydroxyl methyl moiety.

12. The method of claim 1, wherein in Formula I x is 1.

13. The method of claim 12, wherein at least one of $R_1$, $R_2$, $R_3$, or $R_4$ comprises at least one heteroatom selected from the group consisting of O, S, N, and P.

14. The method of claim 1, wherein the at least one cyclic ketal compound is according to Formula I, wherein x is 1, $R_1$, $R_2$, and $R_3$ are H, $R_4$ is —$CH_2$—OH, and both $R_5$ and $R_6$ are —$(CH_2)_4$—$CH_3$, and has the following structure:

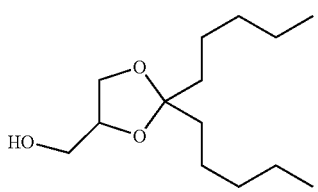 [SMILES: CCCCCC1(CCCCC)OCC(CO)O1]

or wherein the at least one cyclic ketal compound is according to Formula I, wherein x is 1, $R_1$, $R_2$, and $R_3$ are H, $R_4$ is —$CH_2$—OH, $R_5$ —$CH_2$—CH—$(CH_3)_2$, and $R_6$ is —$CH_2$—$(CH(CH_3))$—$CH_2$—CH—$(CH_3)_2$, and has the following structure:

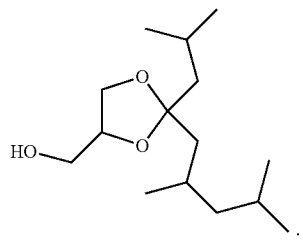 [SMILES: CC(C)CC(C)CC1(CC(C)C)OCC(CO)O1]

15. The method of claim 1, wherein the at least one or more cyclic ketal compound is according to Formula I, wherein x is 1, $R_1$, $R_2$, $R_3$, and $R_4$ are H, $R_5$ is —$CH_2$—CH—$(CH_3)_2$, and $R_6$ is —$CH_2$—$(CH(CH_3))$—$CH_2$—CH—$(CH_3)_2$, and has the following structure:

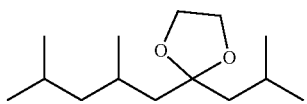 [SMILES: CC(C)CC(C)CC1(CC(C)C)OCCO1]

or wherein the at least one cyclic ketal compound is according to Formula I, wherein x is 1, $R_1$, $R_2$, and $R_3$ are H, $R_4$ is —$CH_2$—OH, $R_5$ is —$CH_2$—$CH_3$, and $R_6$ is —$(CH_2)_{12}$—$CH_3$, and has the following structure:

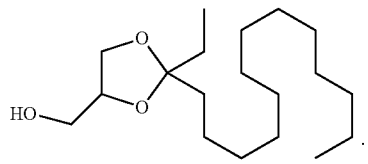 [SMILES: CCCCCCCCCCCCCC1(CC)OCC(CO)O1]

16. The method of claim 1, wherein the at least one cyclic ketal compound according to Formula I is present in the composition in an amount of about 0.5 weight percent.

17. The method of claim 1, wherein step b) occurs in the presence of at least one additional foam control agent.

18. The method of claim 1, wherein step b) comprises providing a foam control composition comprising the least one cyclic ketal compound according to Formula I, and incorporating the foam control composition into an aqueous composition comprising the foodstuff.

19. A foodstuff composition, comprising:
a) at least one foodstuff; and
b) at least one a cyclic ketal compound according to Formula I:

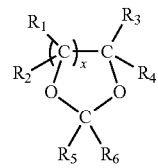

wherein x is an integer in the range of 1-4, $R_1$, $R_2$, $R_3$, and $R_4$ are independently selected from the group consisting of H, a co-member of a ring-structure with at least one of the other $R_1$, $R_2$, $R_3$, or $R_4$, and a monovalent moiety other than H comprising 0 to 5 carbon atoms, wherein one of $R_5$ and $R_6$ comprises at least one carbon atom and the other of $R_5$ and $R_6$ comprises at least 4 carbon atoms, the at least one cyclic ketal compound according to Formula I present in the composition in an amount in the range of 0.01 weight percent to 5 weight percent.

20. The method of claim 1 wherein processing comprises one or more actions selected from the group consisting of washing, slicing, grating, crushing, peeling, mixing, shaking, and stirring the foodstuff.

21. The method of claim 1, wherein following step b) a processed foodstuff is formed and the processed foodstuff is used for the manufacture of a food or beverage product.

* * * * *